United States Patent
Der Manuelian

[11] Patent Number: 5,960,833
[45] Date of Patent: Oct. 5, 1999

[54] FUEL FILLER NECK ASSEMBLY

[75] Inventor: Raffi Der Manuelian, Grand Blanc, Mich.

[73] Assignee: General Motors Corporation, Detroit, Mich.

[21] Appl. No.: 08/927,780

[22] Filed: Sep. 11, 1997

[51] Int. Cl.⁶ .................................................... F16L 9/22
[52] U.S. Cl. .................. 138/112; 138/120; 138/155; 29/890.14; 29/417
[58] Field of Search ................................. 138/111, 112, 138/120, 119, 155, 121; 29/417, 890.14, 525.08, 525.09, 412, 413, 414

[56] References Cited

U.S. PATENT DOCUMENTS

| | | | |
|---|---|---|---|
| 1,783,605 | 12/1930 | Della | 138/177 |
| 3,187,936 | 6/1965 | Downing | 138/111 |
| 3,838,713 | 10/1974 | Tubbs | 138/121 |
| 3,926,222 | 12/1975 | Shroy et al. | 138/122 |
| 3,963,055 | 6/1976 | DeRosa . | |
| 4,096,887 | 6/1978 | Streit . | |
| 4,172,473 | 10/1979 | Lefere et al. . | |
| 4,360,104 | 11/1982 | Lang | 138/121 |
| 4,717,040 | 1/1988 | Stanton et al. . | |
| 4,819,970 | 4/1989 | Umehara | 138/121 |
| 5,054,513 | 10/1991 | Trueb et al. | 138/155 |
| 5,171,044 | 12/1992 | Umezawa et al. | 138/111 |
| 5,182,885 | 2/1993 | Barton, Jr. . | |
| 5,303,730 | 4/1994 | Trueb et al. . | |
| 5,324,557 | 6/1994 | Lupke . | |
| 5,394,904 | 3/1995 | Winter et al. . | |
| 5,476,080 | 12/1995 | Brunnhofer | 138/121 |
| 5,511,720 | 4/1996 | Zaborszki et al. . | |
| 5,635,058 | 6/1997 | Bowman . | |

Primary Examiner—James F. Hook
Attorney, Agent, or Firm—Kathryn A. Marra; Charles K. Veenstra

[57] ABSTRACT

A fuel filler neck assembly is provided for use in a vehicle including a gas cap and housing assembly and a fuel tank. The vehicle has a plurality of predetermined final vehicle dimensions dictating a predetermined variety of final filler neck dimensions. The fuel filler neck assembly extends between the gas cap and housing assembly and the fuel tank for transferring fuel into the fuel tank. The filler neck assembly includes at least one axially elongated fill pipe having an axial length and including a plurality of raised, annular beads thereon. The beads are axially spaced along the fill pipe at predetermined distances each corresponding to respective predetermined final filler neck dimensions. The fill pipe is severable adjacent to each of the beads for permitting adjustment of the length of the fill pipe to each of the corresponding predetermined final filler neck dimensions such that upon severance of the fill pipe, the fuel filler neck assembly is adjustable to accommodate the various predetermined final vehicle dimensions. Preferably, the annular beads are irregularly spaced along the axial length of the fill pipe. Also, preferably the fill pipe is made of a metallic material for reduction of hydrocarbon permeation through the filler neck assembly.

1 Claim, 3 Drawing Sheets

FUEL FILLER NECK ASSEMBLY

TECHNICAL FIELD

This invention relates to a fuel filler neck assembly for use in a motor vehicle, the fuel filler neck assembly being adjustable for fitting in vehicles having variable dimensions.

BACKGROUND OF THE INVENTION

It is well known in the prior art to provide a gas cap and housing assembly. The gas cap and housing assembly is connected to a fuel filler neck assembly which in turn is attached to a fuel tank. A gas cap may be removed from the assembly and gasoline may be inserted into the fuel filler neck assembly by a gasoline pump nozzle for transfer into the fuel tank. The gas cap and housing assembly provides structure to which the fuel filler neck assembly is attached. The fuel filler neck assembly typically includes at least one fill hose and at least one vent hose which are relatively long flexible pieces made entirely of rubber through which the gas is transferred from the housing assembly to the fuel tank. Preferably, the fill and vent hoses are flexible for permitting curved routing paths between the housing assembly and the fuel tank.

It is also known in the prior art to have vehicles, especially trucks, which are modified or upfitted for different vehicle applications to a predetermined range of final vehicle wheelbases (lengths) and widths. These modifications are often performed after initial assembly of the vehicle frame with the fuel tank and fuel filler neck assembly and the final dimensions may not be known at the time of initial assembly. To accommodate these various vehicle dimensions, it is known in the prior art to provide extra long lengths of fill hose and vent hose or extra pieces of fill and vent hose during initial assembly which will accommodate the longest and widest possible vehicle dimensions.

However, this has the disadvantage of having to measure and cut the fill and vent hoses to a particular size at the time of the upfitting while discarding the remainder of the fill and vent hoses which are unused. Alternately, the extra fill and vent hoses will need to either be connected to the base hoses or will be discarded if not needed. The fill and vent hoses are typically fairly expensive rubber hoses and large portions of these are discarded by the upfitters when the vehicles are not completed with the maximum set of predetermined vehicle dimensions. In addition, any elastomeric hoses will have a certain degree of hydrocarbon permeability. It is desirable to minimize the length of elastomeric hoses in the fuel filler neck assembly to reduce evaporative emissions as much as possible.

SUMMARY OF THE INVENTION

The present invention provides alternatives and advantages over the prior art by providing a fuel filler neck assembly for use in a vehicle including a gas cap and housing assembly and a fuel tank. The vehicle has a plurality of predetermined final vehicle dimensions dictating a predetermined variety of final filler neck dimensions. The fuel filler neck assembly extends between the gas cap and housing assembly and the fuel tank for transferring fuel into the fuel tank. The filler neck assembly includes at least one axially elongated fill pipe having an axial length and including a plurality of raised, annular beads thereon. The beads are axially spaced along the fill pipe at predetermined distances each corresponding to respective predetermined final filler neck dimensions. The fill pipe is severable adjacent to each of the beads for permitting adjustment of the length of the fill pipe to each of the corresponding predetermined final vehicle dimensions such that upon severance of the fill pipe, the fuel filler neck assembly is adjustable to accommodate the various predetermined final vehicle dimensions. Preferably, the annular beads are irregularly spaced along the axial length of the fill pipe. Also, preferably the fill pipe is made of a metallic material for reduction of hydrocarbon permeation through the filler neck assembly.

In accordance with other aspects of the invention, first and second fill pipes may be provided. One of the fill pipes is used for the adjustment of filler neck widths and another of the fill pipes is used for the adjustment of filler neck lengths. The fuel filler neck assembly also preferably includes flexible fill hoses extending between and connecting the gas cap and housing assembly to the fill pipes, the fill pipes to each other, and the fill pipes to the fuel tank. Advantageously, the flexible hoses allow movement and positioning of the filler neck assembly for shipping and assembly.

The filler neck assembly may further include one or more axially elongated vent pipes having axial lengths and including a plurality of raised, annular vent beads thereon which are axially spaced along the vent pipe at predetermined distances each corresponding to respective predetermined filler neck lengths and widths. The vent pipes are also severable adjacent to each of the vent beads for permitting adjustment of the length and width of the vent pipes to each of the corresponding predetermined filler neck lengths and widths. The closest fill and vent beads are left on the pipes after being severed for secure connection of the flexible hoses to the pipes.

BRIEF DESCRIPTION OF THE DRAWINGS

The present invention will now be described, by way of example, with reference to the accompanying drawings in which.

DESCRIPTION OF THE PREFERRED EMBODIMENT

Figure 2:
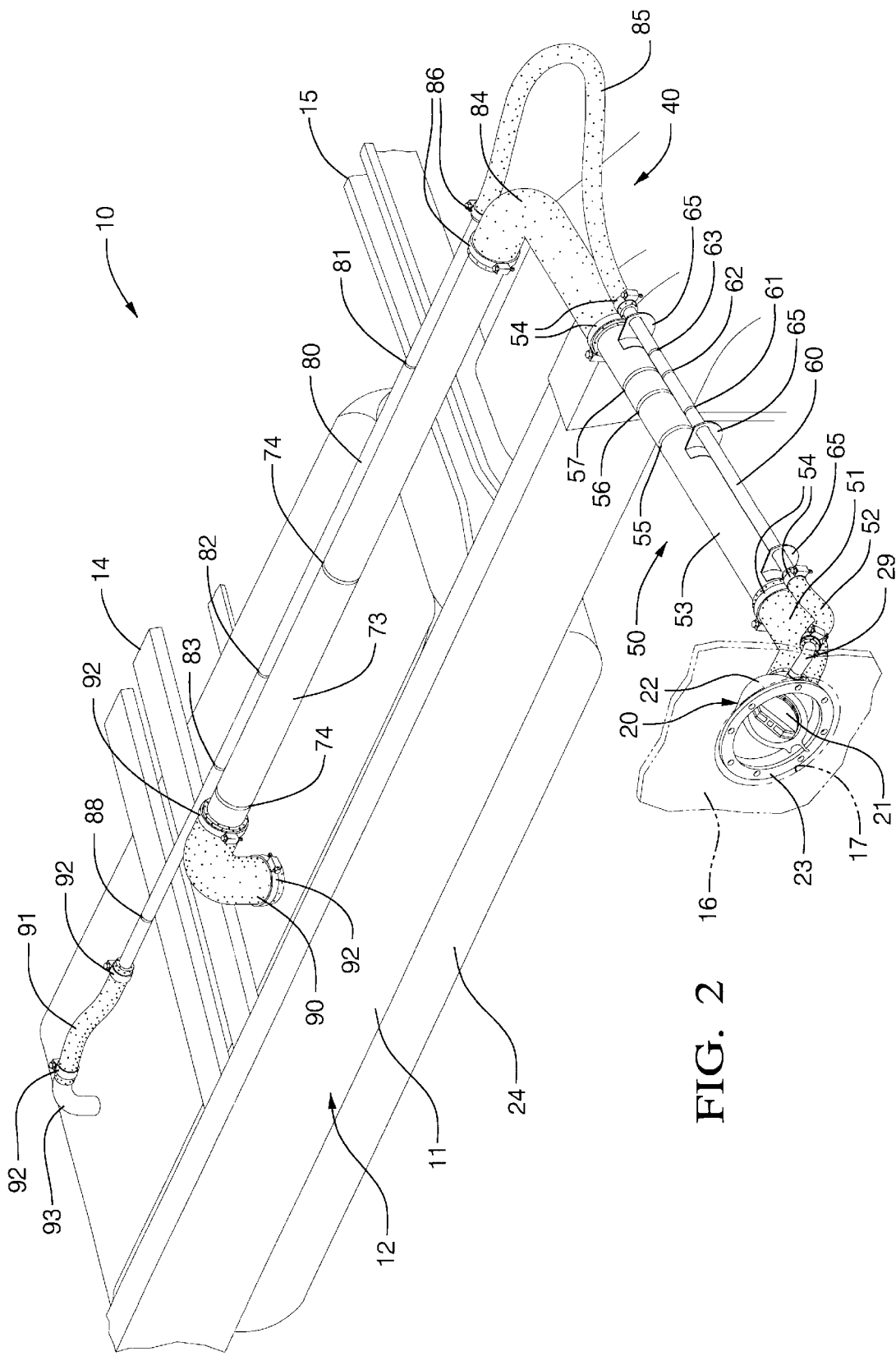
FIG. 2 is a perspective view of a vehicle body partially-broken-away and showing a fuel filler neck assembly assembled in the vehicle for use with a forward-positioned fuel tank.

Referring to FIG. 2, a vehicle 10 includes a vehicle frame 12 including longitudinally extending side rails 11 and laterally extending forward and rearward cross rails 14, 15. The vehicle 10 further includes a side body panel 16, preferably being formed of stamped sheet metal or fiberglass. The side body panel 16 includes an access opening 17. The access opening 17 provides access to a gas cap and housing assembly 20 and a filler neck assembly 40 used for transferring gas into a fuel tank 24, as described further hereinafter.

The fuel tank 24 is preferably a hollow structure designed for storing fuel therein. The fuel tank 24 is suitably attached to the vehicle 10, such as to the vehicle frame 12, in any suitable manner. The fuel tank 24 is preferably shown as a forward-positioned fuel tank 24 in the vehicle 10. The forward-positioned fuel tank 24 may be the only fuel tank 24 provided in the vehicle 10 or may be part of a dual fuel tank system which also includes a rearward-positioned fuel tank (not shown) having its own separate filler neck assembly. For dual fuel tank systems, the forward-positioned fuel tank 24 and the rearward-positioned fuel tank are connected to each other by a connector hose (not shown) for transferring fuel from the rearward-positioned fuel tank to the forward-positioned fuel tank 24 as the fuel is consumed from the forward-positioned fuel tank 24.

The vehicle 10 preferably includes a plurality of predetermined final vehicle dimensions to which the vehicle 10 may be modified or upfitted for use in various applications, as is well known in the industry. This especially occurs when the vehicle 10 is used for commercial trucks which have a wide variety of body styles for various functional uses. The vehicle 10 typically has a variety of predetermined vehicle lengths determined by the vehicle wheelbases. Accordingly, each vehicle 10 includes a plurality of predetermined final filler neck lengths, such as L shown in FIG. 1, depending upon the predetermined vehicle length and upon the use of a single or dual fuel tank system. The predetermined vehicle lengths are typically within certain predetermined ranges for each vehicle manufacturer such that there are a variety of predetermined final filler neck lengths for each vehicle 10. These filler neck lengths are typically spaced at predetermined irregular intervals which are not in any particular pattern. For example, a vehicle 10 may have three possible wheelbases each with an option of single or dual tank systems for a total of six possible final predetermined filler neck lengths which need to be accommodated by the filler neck assembly 40. The final filler neck lengths for the vehicle 10 may not yet be known during initial assembly of the vehicle 10. Advantageously, the filler neck assembly 40 is provided to the upfitter such that it is adjustable to accommodate all of the possible predetermined filler neck lengths, as described further below.

The vehicle 10 typically has a variety of predetermined vehicle widths generally determined by the spacing of the side body panel 16 from the fuel tank 24. Accordingly, each vehicle 10 includes a plurality of predetermined final filler neck widths, such as W shown in FIG. 1, depending upon the predetermined vehicle width. The predetermined vehicle widths are typically within standardized ranges within the industry such that there are a variety of predetermined filler neck widths for each vehicle 10. These predetermined filler neck widths are typically spaced at irregular intervals. For example, a vehicle 10 may have four possible filler neck widths which need to be accommodated by the filler neck assembly 40. The final filler neck width required for a given vehicle is typically not known during initial assembly of the vehicle 10 since it depends on the final body design. Advantageously, the filler neck assembly 40 can be provided to the after-market upfitter such that it is adjustable to accommodate all of the possible predetermined final filler neck widths, as described further below.

Figure 1:
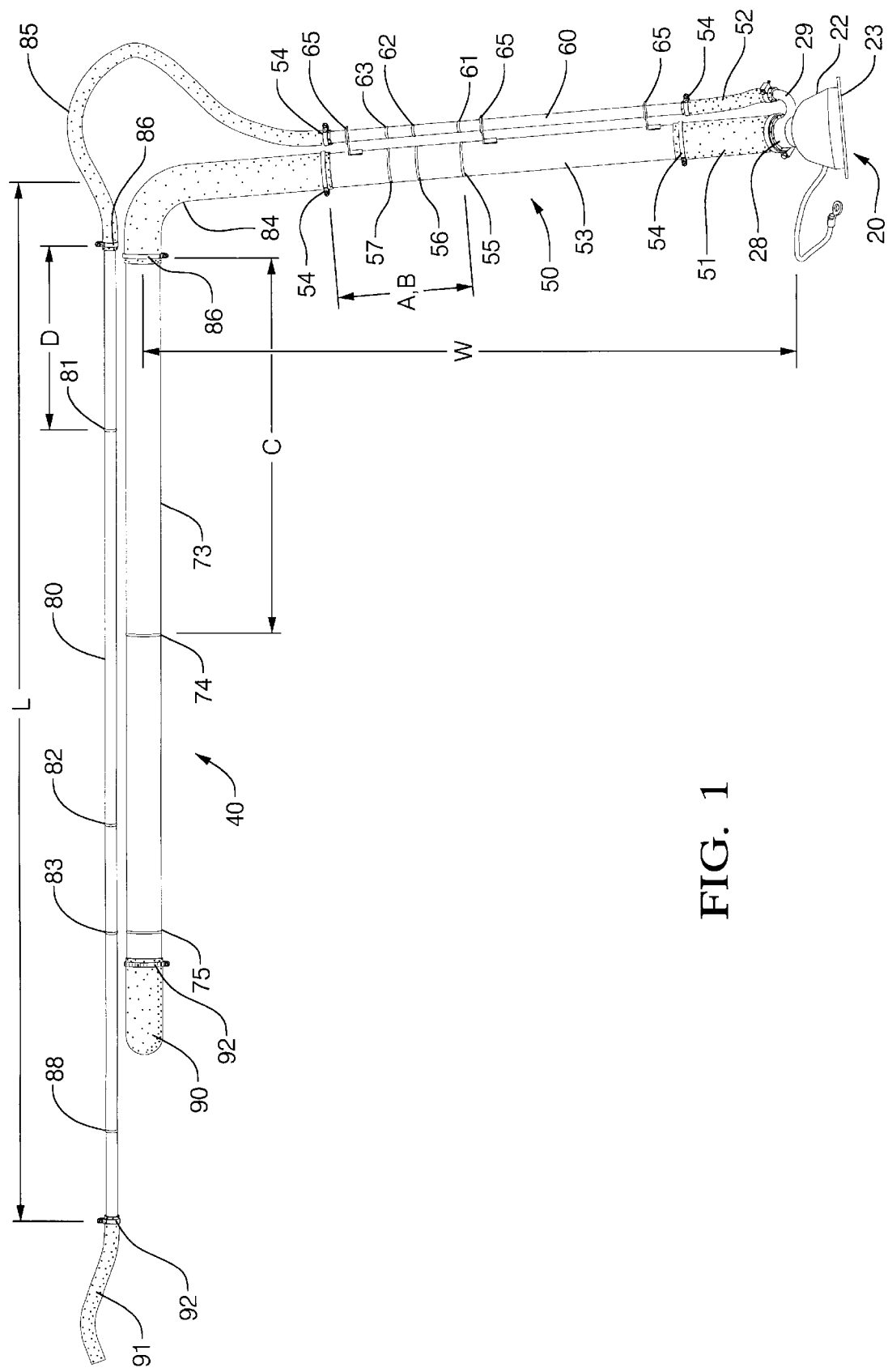
FIG. 1 is a plan view of a filler neck assembly and the gas cap and housing assembly according to the present invention.

A gas cap and housing assembly 20 includes the gas cap 21 and the filler neck housing 22. The filler neck housing 22 is generally cup-shaped and preferably formed from a generally rigid material, such as a rigid plastic or metal, for providing support structure onto which a filler neck assembly 40 can be mounted. The filler neck housing 22 includes a flange portion 23 which is attached to the side body panel 16 when the vehicle 10 is fitted with its final body configuration. As best shown in FIG. 1, the gas cap and housing assembly 20 includes a filler attachment 28 and a vent attachment 29 to which the fill and vent pipes 53, 60 of the filler neck assembly 40 are attached, respectively, as described further below.

When it is desired to load fuel into the vehicle 10, the gas cap 21 may be removed such that fuel may be delivered into the filler neck assembly 40 by a gasoline pump nozzle as is well known in motor vehicles. The filler neck assembly 40 transfers gas between the filler neck housing 22 and the fuel tank 24.

The filler neck assembly 40 includes the fill and vent pipe assembly 50 including a flexible first fill hose 51 and a flexible first vent hose 52. The first fill and vent hoses 51, 52 are axially elongated and are preferably made of an elastomeric material, such as rubber. The rubber material preferably has as great a resistance to permeation by fuel hydrocarbons as possible for flexible hose material. The first fill hose 51 has one end attached to the filler attachment 28 of the gas cap and housing assembly 20 and an opposite end attached to a first fill pipe 53. The first vent hose 52 has one end attached to the vent attachment 29 of the gas cap and housing assembly 20 and an opposite end attached to a first vent pipe 60. The ends of the first fill and vent hoses 51, 52 are secured in place by first clamps 54.

The filler neck assembly 40 may also include a flexible second fill hose 84 and a flexible second vent hose 85. The second fill and vent hoses 84, 85 are axially elongated and are preferably made of an elastomeric material, such as rubber. The rubber material preferably has as great a resistance to permeation by fuel hydrocarbons as possible for flexible hose material. The second fill hose 84 has one end attached to the first fill pipe 53 and an opposite end attached to a second fill pipe 73. The second vent hose 85 has one end attached to the first vent pipe 60 and an opposite end attached to a second vent pipe 80. The ends of the second fill and vent hoses 84, 85 are secured in place by first clamps 54 and second clamps 86.

The fill and vent pipe assembly 50 of the filler neck assembly 40 includes a first fill pipe 53 and a first vent pipe 60. The first fill and vent pipes 53, 60 are each adjustable for accommodating various predetermined fuel filler neck widths corresponding to various predetermined vehicle widths. The axially elongated first fill pipe 53 has an axial length. The first fill pipe 53 includes a plurality of raised, annular first fill beads 55, 56, 57 thereon. The first fill beads 55, 56, 57 are axially spaced along the first fill pipe 53 at predetermined distances each corresponding to respective predetermined final filler neck widths based on the vehicle widths. For example, the first fill pipe 53 is shown in FIG. 2 installed at its longest length for accommodating the greatest predetermined filler neck width.

To accommodate shorter filler neck widths, the first fill pipe 53 is severable adjacent to each of the first fill beads 55, 56, 57 for permitting adjustment of the axial length of the first fill pipe 53 to each of the corresponding predetermined filler neck widths required for body variations in the vehicle 10. For example, the first fill pipe 53 may be severed adjacent to the first fill bead 55, such that first fill bead 55 remains on the used portion of the first fill pipe 53. The unused length of the first fill pipe 53, designated as approximately A in FIG. 1, may be discarded. Then the second fill hose 84 is slid back over the first fill pipe 53 and the first fill bead 55 such that the first fill bead 55 provides a tight fit for the second fill hose 84 and one of the clamps 54 can be placed on the second fill hose 84 past the first fill bead 55 to securely attach the second fill hose 84 to the first fill pipe 53. Since the first fill beads 55, 56, 57 are advantageously, in predetermined positions corresponding to the predetermined filler neck widths, the upfitter knows where to sever the first fill pipe 53 and also is automatically provided with the first fill beads 55, 56, 57 in the proper position for secure re-attachment of the second fill hose 84. Thus, it will be appreciated that the first fill pipe 53 is also severable at first fill beads 56 or 57 in a similar manner as described with respect to first fill bead 55. Accordingly, the first fill pipe 53 can be easily adjusted to accommodate a variety of predetermined filler neck widths required for predetermined vehicle widths. It will also be appreciated that the second fill hose 84 could also be severed prior to reattachment to the first fill pipe 53 to provide fine adjustments to the length of the filler neck assembly 40.

Also advantageously, the first fill pipe 53 is preferably made of a metallic material, such as steel. The metallic material cannot be permeated by fuel hydrocarbons. Thus, the first fill pipe 53 provides reduced hydrocarbon emissions for the filler neck assembly 40. Advantageously, the length of rubber first fill hose 51 is reduced but is still sufficient to provide flexibility to the filler neck assembly 40 for adjusting the position of the gas cap and housing assembly 20 relative to the side body panel 16 during assembly and shipping, as described further below.

Similar to the first fill pipe 53, an axially elongated first vent pipe 60 is provided having an axial length. The first vent pipe 60 includes a plurality of raised, annular first vent beads 61, 62, 63 thereon which are preferably spaced along the first vent pipe 60 at the same intervals at which the first fill beads 55, 56, 57 are spaced along the first fill pipe 53. The first vent beads 61, 62, 63 are axially spaced along the first vent pipe 60 at predetermined distances each corresponding to respective predetermined final filler neck widths based on the vehicle widths. For example, the first vent pipe 60 is shown at its longest length for accommodating the greatest predetermined filler neck width.

To accommodate shorter filler neck widths, the first vent pipe 60 is severable adjacent each of the first vent beads 61, 62, 63 for permitting adjustment of the axial length of the first vent pipe 60 to each of the corresponding predetermined filler neck widths. For example, the first vent pipe 60 may be severed adjacent the first vent bead 61, such that first vent bead 61 remains on the used portion of the first vent pipe 60. The unused length of the first vent pipe 61, designated as approximately B on FIG. 1, would be discarded. Then the second vent hose 85 is slid over the first vent pipe 60 and the first vent bead 61 such that the first vent bead 61 provides a tight fit for the second vent hose 85 and one of the clamps 54 can be placed on the second vent hose 85 past the first vent bead 61 for secure attachment of the second vent hose 85 to the first vent pipe 60. Since the first vent beads 61, 62, 63 are advantageously in predetermined positions for the predetermined filler neck widths, the upfitter knows where to sever the first vent pipe 60 and also is automatically provided with the first fill beads 61 or 62 or 63 in the proper position for secure attachment of the second vent hose 85. Thus, it will be appreciated that the first vent pipe 60 is severable at first vent beads 62 or 63 in a similar manner as described with respect to first vent bead 61. Accordingly, the first vent pipe 60 can be easily adjusted to accommodate a variety of predetermined filler neck widths required for predetermined vehicle widths. It will also be appreciated that the second vent hose 85 could also be severed prior to reattachment to the first vent pipe 60 to provide fine adjustments to the length of the filler neck assembly 40.

Also advantageously, the first vent pipe 60 is preferably made of a metallic material, such as steel. The metallic material cannot be permeated by fuel hydrocarbons. Thus, the first vent pipe 60 provides reduced hydrocarbon emissions for the filler neck assembly 40. Advantageously, the length of rubber first vent hose 52 is reduced, but is still sufficient to provide flexibility to the filler neck assembly 40 for adjusting the position of the gas cap and housing assembly 20 relative to the side body panel 16.

It will be appreciated that the first fill pipe 53 and the first vent pipe 60 are each preferably severed to similar lengths to accommodate a certain predetermined filler neck width. For example, when the first fill pipe 53 is cut at the first fill bead 55, then the first vent pipe 60 is severed at the first vent bead 61. Also, a plurality of connector clips 65 may be used to attach the first fill pipe 53 and the first vent pipe 60 to each other for ease of shipping and assembly.

Advantageously, the second fill and vent hoses 84, 85 provide a flexible connection between the first and second fill pipes 53, 73 and the first and second vent pipes 60, 80 such that the filler neck assembly 40 can be freely bent and rotated at this juncture. Thus, the fill and vent pipe assembly 50 with the gas cap and housing assembly 20 can be shipped in a shipping position (not shown) in which the fill and vent pipe assembly 50 is rotated approximately 90 degrees about the second fill and vent hoses 84, 85 such that the filler neck assembly 40 is generally parallel with the vehicle side rail 11 for a more compact shipping arrangement.

The filler neck assembly 40 also includes the second fill pipe 73 and the second vent pipe 80. The second fill and vent pipes 73, 80 are each adjustable for accommodating various predetermined final filler neck lengths corresponding to various predetermined vehicle lengths and single or dual fuel tank systems. The axially elongated second fill pipe 73 has an axial length. The second fill pipe 73 includes a plurality of raised, annular second fill beads 74, 75 thereon. The second fill beads 74, 75 are axially spaced along the second fill pipe 73 at predetermined distances each corresponding to respective predetermined final filler neck lengths. The second fill pipe 73 includes second fill beads 74, 75 which correspond to variations in the vehicle length or wheelbase only. So for example, the second fill pipe 73 is shown at its longest length for accommodating the longest vehicle length with either a single or dual fuel tank system. The second fill bead 74 will accommodate the second longest vehicle length with either a single or dual fuel tank system. The second fill bead 75 is used to accommodate the third longest vehicle length with either a single or dual fuel tank system.

To accommodate shorter filler neck lengths for shorter vehicle lengths, the second fill pipe 73 is severable to adjacent each of the second fill beads 74, 75 for permitting adjustment of the axial length of the second fill pipe 73 to each of the corresponding predetermined vehicle filler neck lengths. For example, the second fill pipe 73 may be severed adjacent to the second fill bead 74, such that second fill bead 74 remains on the used portion of the second fill pipe 73. The unused length of the second fill pipe 73, designated as approximately C in FIG. 1, may be discarded. Then the second fill hose 84 is slid over the second fill pipe 73 and one of the second clamps 86 can be placed on the second fill hose 84 past the second fill bead 74 to securely attach the second fill hose 84 to the second fill pipe 73. Since the second fill beads 74, 75 are advantageously in predetermined positions for the predetermined filler neck lengths, the upfitter knows where to sever the second fill pipe 73 and also is automatically provided with the second fill beads 74, 75 and does not need to fabricate them separately. It will further be appreciated that the second fill hose 84 could also be severed prior to reattachment to the second fill pipe 73 to provide fine adjustment of the length of the filler neck assembly 40.

Also advantageously, the second fill pipe 73 is preferably made of a metallic material, such as steel. The metallic material cannot be permeated by fuel hydrocarbons. Thus, the second fill pipe 73 provides reduced hydrocarbon emission for the filler neck assembly 40. Advantageously, the length of rubber second fill hose 84 is reduced, but is still sufficient to provide flexibility to the filler neck assembly 40, as described above for shipping and for adjusting the position of the gas cap and housing assembly 20 relative to the side body panel 16 during final body assembly.

Similar to the second fill pipe 73, the fuel filler neck assembly 40 includes an axially elongated second vent pipe 80 having an axial length. The second vent pipe 80 includes a plurality of raised, annular second vent beads 81, 82, 83, 88 thereon which are preferably spaced along the second vent pipe 80 at different intervals than are found on the second fill pipe 73. Instead, the second vent pipe 80 is designed to accommodate an even greater number of variations including both the vehicle widths and single or dual fuel tanks systems. For example, the second vent pipe 80 is shown at its longest length for accommodating the longest predetermined filler neck length for the longest predetermined vehicle length with a single fuel tank system. The second vent bead 81 is used to accommodate the longest vehicle length with a dual fuel tank system. Second vent bead 82 is used to accommodate the second longest vehicle length with a single fuel tank system and so on for the second vent beads 83 and 88. While many variations are possible, it is only important that the second fill and vent beads 74, 75, 81, 82, 83, 88 be spaced to provide filler neck lengths that accommodate the predetermined set of filler neck lengths required for the predetermined set of vehicle lengths or wheelbases and fuel tank systems available for a given vehicle 10.

To accommodate shorter filler neck lengths, the second vent pipe 80 is severable adjacent to each of the second vent beads 81, 82, 83, 88 for permitting adjustment of the axial length of the second vent pipe 80 to each of the corresponding predetermined vehicle lengths. For example, the second vent pipe 80 may be severed adjacent to the second vent bead 81, such that second vent bead 81 remains on the used portion of the second vent pipe 80. The unused length of the second vent pipe 81, designated approximately as D in FIG. 1, may be discarded. Then the second vent hose 85 is slid over the second vent pipe 80 and the second vent bead 81 and one of the second clamps 86 can be placed on the second vent hose 85 past the second vent bead 81 for secure attachment of the second vent hose 85 to the second vent pipe 80. It will be appreciated that the second vent pipe 80 is also severable at second vent beads 82, 83, 88 in a similar manner as described with respect to second vent bead 81 to accommodate a variety of predetermined filler neck lengths required for predetermined vehicle lengths. It will also be appreciated that the second vent hose 85 could also be severed prior to reattachment to the second vent pipe 80 to provide a fine adjustment of the filler neck assembly 40.

Also advantageously, the second vent pipe 80 is preferably made of a metallic material, such as steel. The metallic material cannot be permeated by fuel hydrocarbons. Thus, the second vent pipe 80 provides reduced hydrocarbon emissions for the filler neck assembly 40. Advantageously, the length of rubber second vent hose 85 is reduced and partially replaced by the second vent pipe 80, but is still sufficient to provide flexibility to the filler neck assembly 40 for adjusting the position of the gas cap and housing assembly 20 and fill and vent pipe assembly 50 relative to the side body panel 16 during shipping and assembly.

The filler neck assembly 40 may also include a flexible third fill hose 90 and a flexible third vent hose 91. The third fill and vent hoses 90, 91 are axially elongated and are preferably made of an elastomeric material, such as rubber. The third fill hose 90 has one end attached to the second fill pipe 73 and an opposite end attached to the fuel tank 24. The third vent hose 91 has one end attached to the second vent pipe 80 and an opposite end attached to the fuel tank 24. The ends of the second fill and vent hoses 90, 91 are secured in place by third clamps 92. Advantageously, the second fill and vent hoses 90, 91 provide a flexible connection between the second fill and vent pipes 73, 80 and the fuel tank 24 such that the filler neck assembly 40 can be freely bent and rotated at this juncture. It will be appreciated that the fuel tank 24 preferably includes outwardly protruding fill and vent connector tubes, such as 93, to which the third fill and vent hoses 90, 91 are connected at the fuel tank 24.

It will be appreciated that the lengths of the rubber fill and vent hoses 51, 52, 84, 85, 90, 91 are reduced and largely replaced by the metallic fill and vent pipes 53, 60, 73, 80 such that the overall permeation of hydrocarbons for the filler neck assembly 40 can be reduced while maintaining the flexibility of the filler neck assembly 40 needed for shipping and assembly. It will further be appreciated that a single filler neck assembly 40 can be used to accommodate all predetermined variations in length and width of the vehicle 10 so that numerous filler neck assemblies need not be provided. Additionally, fabrication of extra beads after shipping the filler neck assembly 40 with the vehicle 10 does not need to be done by the upfitters. Furthermore, the predetermined placement of the beads 55, 56, 57, 61, 62, 63, 74, 75, 81, 82, 83, 88 ensures that there will be a tight connection with all of the hoses 51, 52, 84, 85 for further minimization of hydrocarbon permeation through the filler neck assembly 40. It will also be appreciated that it is more desirable to discard portions of the metallic pipes 53, 73, 60, 80 than portions of rubber hoses as in the prior art, for both economic reasons and recyclability or reuse of the discarded portions.

It will be understood that a person skilled in the art may make modifications to the preferred embodiment shown herein within the scope and intent of the claims. Although the filler neck assembly 40 is shown as adjustable for both predetermined filler neck widths and filler neck lengths, it will be appreciated that any combination of final filler neck dimensions corresponding to a predetermined final set of vehicle dimensions may be accommodated. For example, the filler neck assembly could accommodate variations in predetermined filler neck widths only or variations in predetermined filler neck lengths only. It will also be appreciated that annular beads (not shown) are also included adjacent the clamps 54, 86 and 92 as the filler neck assembly 40 is originally provided. It will further be appreciated that while the pipes 53, 73, 60, 80 are severable at the beads 55, 56, 57, 61, 62, 63, 74, 75, 81, 82, 83, 88 to provide major adjustments for the final vehicle dimensions, the hoses especially the second fill and vent hoses 84, 85 may also be severed for minor adjustments to fit the final vehicle dimensions.

Figure 3:
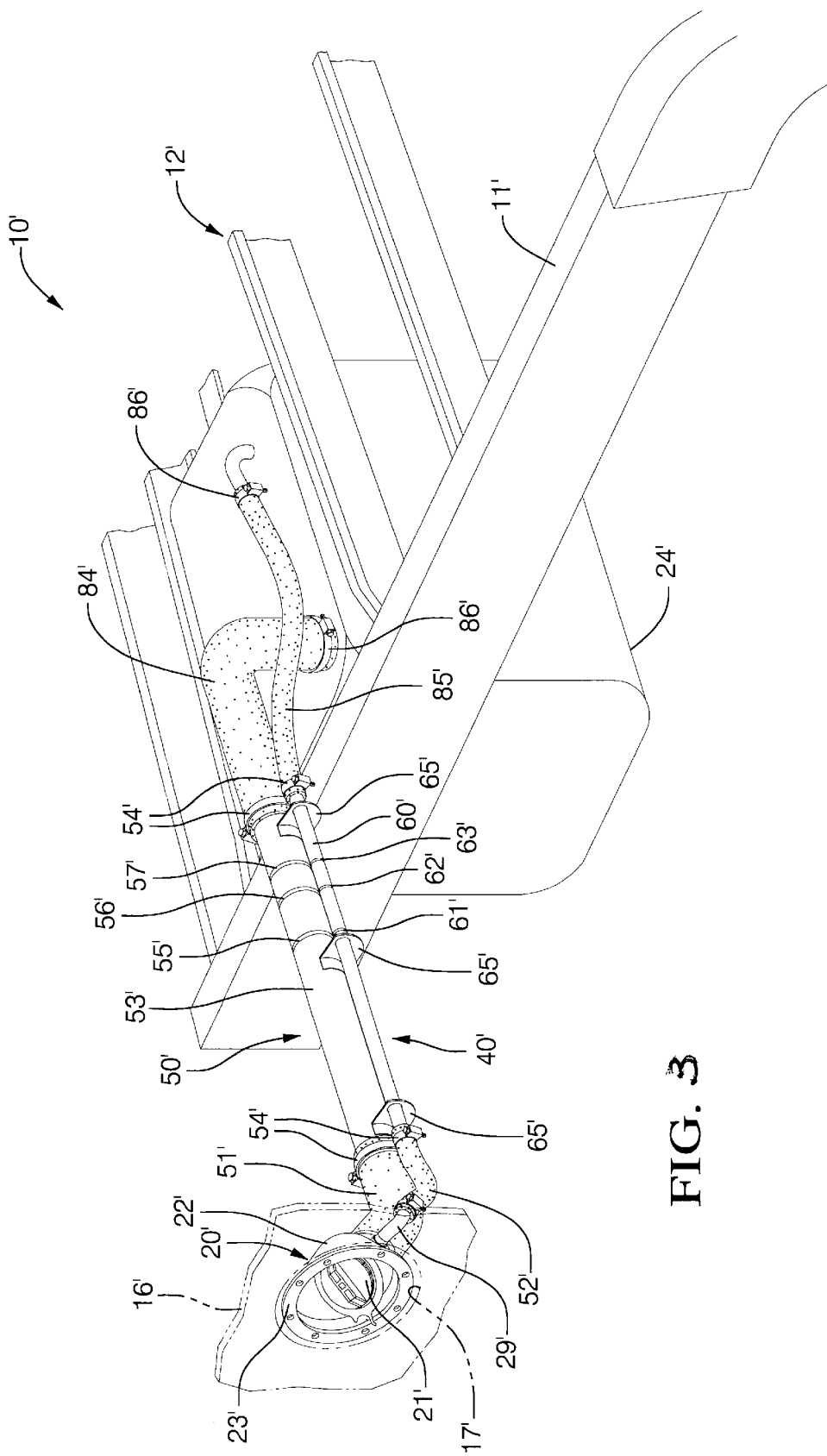
FIG. 3 is an alternate embodiment of the invention showing a perspective view of a vehicle body partially-broken-away and showing a fuel filler neck assembly used with a rearward-positioned fuel tank.

FIG. 3 shows an alternate embodiment of the invention similar to that of FIGS. 1 and 2, but showing a filler neck assembly 40' for use with a rearward-positioned fuel tank 24'. Similar components having similar descriptions to those of FIGS. 1 and 2 are denoted by similar numerals with a prime added. The rearward-positioned fuel tank 24' may be used alone or preferably in combination with a forward-positioned fuel tank 24 and filler neck assembly 40 as shown in FIGS. 1 and 2. The main difference is that the filler neck assembly 40' shown for the rearward-positioned tank 24' is only adjustable for variations of filler neck widths based on variations in vehicle widths. Thus, the filler neck assembly 40' includes the parts of a first fill hose 51', a first vent hose 52', a first fill pipe 53' including first fill beads 55', 56', 57', and a first vent pipe 60' including first vent beads 61', 62', 63'. The width adjustment of the first fill pipe 53' and the first vent pipe 60' operates in a similar manner as described above for first fill and vent pipes 53, 60. The second fill hose 84' has one end connected to the first fill pipe 53' and has another end operatively connected to the fuel tank 24'. The second vent hose 85' has one end connected to the first vent pipe 60' and has another end operatively connected to the fuel tank 24'. Thus, the second fill and vent hoses 84', 85' are operatively connected to the fuel tank 24' and the remaining components, as shown in FIGS. 1 and 2 for the adjustment of filler neck lengths, are not necessary.

While the present invention has been described as carried out in specific embodiments thereof, it is not intended to be limited thereby but is intended to cover the invention broadly within the scope and spirit of the appended claims.

What is claimed is:

1. A method of assembling an adjustable fuel filler neck assembly in a vehicle having a plurality of predetermined vehicle dimensions dictating a variety of corresponding predetermined filler neck dimensions, the method comprising the steps of:

providing at least one axially elongated fill pipe having an axial length and including a plurality of raised, annular beads thereon, the beads being axially spaced along the fill pipe at predetermined distances each corresponding to respective predetermined filler neck dimensions, and severing the fill pipe adjacent to a particular one of the beads such that the one of the beads adjacent to the location of the severe remains attached to a usable portion of the fill pipe such that the length of the fill pipe is adjusted to the particular corresponding predetermined final vehicle dimensions; and attaching at least one flexible hose to the one of the beads located adjacent to the severe by sliding an end of the flexible hose over the one of the beads and clamping the flexible hose to the fill pipe.

* * * * *